May 19, 1970 R. J. WELDON 3,513,320
ARTICLE IDENTIFICATION SYSTEM DETECTING PLURALITY OF COLORS
DISPOSED ON ARTICLE
Filed Oct. 31, 1966 2 Sheets-Sheet 1

INVENTOR
ROGER J. WELDON

BY Fisher, Christen, Sabol & Caldwell

ATTORNEYS

INVENTOR
ROGER J. WELDON

BY Fisher, Christen, Sabol & Caldwell
ATTORNEYS

United States Patent Office 3,513,320

Patented May 19, 1970

3,513,320

ARTICLE IDENTIFICATION SYSTEM DETECTING PLURALITY OF COLORS DISPOSED ON ARTICLE

Roger J. Weldon, Tucson, Ariz., assignor to Markstems, Inc., Whittier, Calif., a corporation of California Filed Oct. 31, 1966, Ser. No. 590,862
Int. Cl. G06k *9/00*
U.S. Cl. 250—219 7 Claims

ABSTRACT OF THE DISCLOSURE

A system for identifying articles employs indicia means for the articles comprising colorants to be applied to each article in such a way that the colorants may be sensed in predetermined sequence during movement of the article past a scanning means regardless of the horizontal orientation of the indicia during said movement, regardless of the lateral placement of the article on a conveying means, and regardless of the plane and conformation of the surface of the indicia provided only that the indicia can be fully sensed by the sensing means.

This invention relates to sensing and identifying systems, and more particularly to systems for reading coded information from visually presented indicia by means of sensing devices which automatically extract the information presented by the indicia.

One form of the invention is to provide an automatic means of transferring information contained in coded form within a visually presented indicia to an electronic system such as a recording or computing system. Such recording and computing devices includes the use of punched cards, punched tape, magnetic spots or lines carried on plastic tapes or paper.

It is characteristic of all these systems to carry information on objects in a coded form, which coded from is sensed and then translated by one or more steps into another coded form that is suitable to an electronic system.

This general principle will be hereinafter referred to as "reading." It should be understood that in this sense the word "reading" is to be distinguished from the process of obtaining information about an object or material by observation of the intrinsic properties of the object or material; in this sense "reading" refers to codes produced by extrinsically applied symbols.

In the present invention means are provided to obtain coded information from materials or objects through electromagnetic radiations emanating from such materials or objects and to introduce that information in the form of coded signals into an electronic system. The reading can be done rapidly and an automatic verification of the reading can be provided to eliminate the possibility of errors and without the necessity for decoding or interpreting by human intervention.

In the application of this invention several well known principles are employed. Once of these principles is that a photoelectric cell can be made responsive to an electromagnetic radiation of a given wave length to produce an electrical current for introduction into another electrical system as a signal. Another principle is that materials used to color reflecting surfaces are capable of absorbing electromagnetic wave lengths of certain frequencies while at the same time reflecting electromagnetic wave lengths of other frequencies. Another principle employed is the use of fine gratings to provide refractive separation of predetermined wave lengths of electromagnetic radiation. A still further known principle is that colors having different reflective frequencies may be subtractively identified when mixed together or overlaid on a single surface.

In general, the invention is also based on the use of relatively narrow and non-overlapping bands of electromagnet waves in the ultra-violet visible and infrared regions and for this purpose these will all be referred to as "hues" although some of these are invisible to the unaided eye.

In order to use hues in a code the hues must be controlled. Such control can begin at the point of selecting a source of radiation. Control of hues also occurs when these radiations are reflected from surfaces. Further, it occurs when filters, gratings or prisms are used to separate and to select hues which are permitted to strike the sensors. There is a further control in the circuitry of the electronic system into which the responses of the photoelectric cells are made; this type of control is well established in the art of computer design and forms no part of this invention.

A basic feature of this invention rests on the fact that a small surface of homogeneous color can simultaneously emit a large number of hues. Theoretically, a surface so small as to be a point of light that is optically unresolvable, as is the case of distant stars, can emit an indefinitely large number of hues. The number of hues depends on how narrow and how close together the electromagnetic radiation bands can be made, and yet be controlled in a practical manner.

A selected multiplicity of hues emitted by a single small area, which will be herein referred to as a "patch," constitutes a code. The use of color as a code is not novel. Nor is the use of single hues reflected by different patches as a code novel. The novelty of the present invention results from the use of a multiplicity of hues emitted by a single patch as a contrived and controllable code to carry information.

Such coding is made possible by the subtractive method of color control, which method is itself well known, but has not to my knowledge been used in the coding of hues for automatic reading by sensors.

The terms "emit" and "emission" refer to several kinds of radiation such as electric arc radiation, black body radiation, filtered light, reflectance, luminescence, fluorescence and phosphorescence. These phenomena can occur as small patches on objects or can be larger areas shielded to act as patches. The particular embodiment to be described makes use of reflectance and fluorescence for controlling the hues emitted by patches, but other embodiments using electric arc radiation, filtered light, luminescence and phosphorescence can be visualized as possible embodiments.

A patch is not itself an object, but rather is an indicia which is added on to the surface of an object. It is a designated surface area of an object that emits a number of hues, among which are a number of specified hues used to carry information. These last are referred to as "code hues." The code hues are specifically designed for the operation of the various embodiments of this invention to provide the coordination among components that is necessary to accomplish the automatic reading. The code hues are selected for ease and efficiency of their being controlled. The code hues must be produced, reflected, filtered or diffracted into the sensors, and responded to by those sensors.

Patches are the means of controlling, in the device to be described, the reflectance and fluorescence of hues. Patches are said to be "on" objects, or objects are said to "carry" patches and may include such things as cards, pieces of paper, sheet metal, cans, bags, tapes, wood, pages of books, book covers, envelopes, containers and contents of containers.

Patches may carry information about the objects to which they are attached. On the other hand, patches may be on secondary objects called "tags" or "media" which are associated with the objects which are the primary references of the information coded on the patches.

Patches can be placed at different locations on an object, thus providing the possibility of position control. Patches can be made to emit hues that are independent of the hues emitted by the object, thus providing emission control. The size and shape of patches can be varied, thus providing size and shape control. Patches are relatively small and therefore are economical of space and materials. A number of patches can be put on an object, thus providing for the use of a *multi-patch* code, which is an important feature of this invention. Because the hues emitted by a patch can be controlled with some precision even under general illumination, there is no requirement to read them under darkened conditions. Because the utilized property of patches is their emission of electromagnetic radiation, there is no requirement for intimate contact between object and sensor as there is in most other means of automatic reading. This makes possible the automatic reading of information from objects of many different sizes and shapes.

A feature of the present invention that is of considerable importance is the potential amount of information which can be contained in a multi-patch code. Ideally, a very large number of code hues seems possible. However, because of the unprecise control of hues in the present state of the art, the number of code hues that can be used in a device is at present rather limited. This is not a serious handicap, however, when it is recalled that a small patch emits all the code hues simultaneously and that each combination, or subset, of the set of code hues is a uniquely different signal. Thus if the number of code hues is N, and the possible number of uniquely different signals from a single patch is M, then $$M=(2^N-1)$$

since the null subset is not considered to be a signal. Table 1 gives the various values of M for the numbers of code hues, N, up to 8.

TABLE I.—CORRRESPONDING NUMBER OF CODE HUES, N, AND NUMBER OF UNIQUE SIGNALS, M

| N | M |
|---|---|
| 3 | 7 |
| 4 | 15 |
| 5 | 31 |
| 6 | 63 |
| 7 | 127 |
| 8 | 255 |

The number of unique signals that can be derived from a single patch with a given N is in a sense the modulus of the patch. It is the number of different kinds of coded symbols that can occupy one position; the number of different kinds of patches available for use. If only two kinds of symbols can occupy a position, there is a binary system, or a Mod 2 arithmetic. If three kinds of symbols, there is a Mod 3 arithmetic, and if 10, a Mod 10 arithmetic or decimal system. The moduli shown for patches in Table 1, under M, are quite respectable even for the small numbers of code hues.

Using a multi-patch code the total number of unique messages is a function of the number of patches, P, as well as N. If T is the total number of unique messages then $$T=M^P$$

and the number of bits, B, that can be handled by the code is $$B=\mathrm{Log}_2\, T$$

For various values of N and P, the values of T and B are given in Table 2.

TABLE 2.—NUMBER OF BITS, B, AND NUMBER OF UNIQUE MESSAGES, T, FOR VARIOUS VALUES OF N, CODE HUES AND P, PATCHES

[N—Number of Code Hues]

| | | 3 | 4 | 5 | 6 | 7 | 8 |
|---|---|---|---|---|---|---|---|
| 1 | B | 2.8 | 3.9 | 5.0 | 6.0 | 7.0 | 8.0 |
| | T | 7 | 15 | 31 | 63 | 127 | 255 |
| 2 | B | 5.6 | 7.8 | 9.9 | 11.9 | 14.0 | 16.0 |
| | T | 49 | 225 | 961 | 3,969 | 16,129 | 65,025 |
| 3 | B | 8.4 | 11.7 | 14.9 | 17.9 | 20.9 | 24.0 |
| | T | 343 | 3,375 | 29,791 | 250,047 | $2.0\times10^6$ | $1.6\times10^7$ |
| 4 | B | 11.2 | 15.6 | 19.8 | 23.9 | 27.9 | 32 |
| | T | 2,401 | 50,625 | 923,521 | $1.6\times10^7$ | $2.6\times10^8$ | $4.2\times10^9$ |
| 5 | B | 14.0 | 19.5 | 24.7 | 29.9 | 34.9 | 40 |
| | T | 16,807 | 759,375 | $2.8\times10^7$ | $9.9\times10^8$ | $3.3\times10^{10}$ | ---- |
| 6 | B | 16.8 | 23.4 | 29.7 | 35.8 | ---- | 48 |
| | T | 117,649 | $1.1\times10^7$ | $8.9\times10^8$ | $6.2\times10^{10}$ | ---- | ---- |
| 7 | B | 19.6 | 27.3 | 34.7 | ---- | ---- | 56 |
| | T | 823,543 | $1.7\times10^8$ | $2.8\times10^{10}$ | ---- | ---- | ---- |
| 8 | B | 22.4 | 31.2 | ---- | ---- | ---- | 64 |
| | T | $5.8\times10^6$ | $2.6\times10^9$ | ---- | ---- | ---- | $1.7\times10^1$ |

It is clear from Table 2 that the use of a multi-patch reading device holds the potentiality of being able to introduce a large amount of information into an electronic system. It becomes a practical problem of determining how much information needs to be read, and what manner of providing the reading power is best under the existing state of several arts involved. If a value of $T=10{,}000{,}000$ were required, it could be obtained with 4 code hues and 6 patches, or alternatively with 6 code hues and 4 patches.

If the reading device is used to identify objects then T gives the number of kinds of objects that the reading device can uniquely identify.

In principle there are two methods by which the reflected hues from a patch can be controlled. One method is the color additive method in which tiny dots that reflect each of several hues are put on the patch with relatively small amount of overlay of dots of different colors. This is the method commonly used in color printing. A serious problem arises in the use of the additive method in reading coded information. The problem is that in ordinary printing, using screens, bare spots of the underlying surfaces are left. Such bare spots reflect many hues in an uncontrolled manner.

The other method of color control is the color subtractive method in which solid colors cover the entire patch. Colors are combined by mixing coloring materials, or "colorants," before applying them to a surface or by overlaying one material on another. In this method only those hues are reflected from the surface which are not absorbed by any of the combined materials. In other words, each added color subtracts from the reflection those hues which it absorbs and adds nothing to the reflection. Although this method is impractical for color printing, it is suitable in the present invention of code reading.

As a transition into this description a brief summary of the development to this point follows. From the numerous hues provided by daylight or by board spectrum lamps certain code hues are selected to carry information. Subsets of these code hues are caused to be reflected from particular patches on objects according to the information to be transmitted into an electronic system. Each code hue that is reflected by one patch at one particular moment is sensed by one code sensor in a group of sensors. There are as many sensors in a group as there are code hues so that the several code hues reflected by the patch activate their corresponding sensors. The responses of the sensors to a patch constitute a coded signal which is introduced into an electronic system. Coded signals activated by a multiplicity of patches constitute a message. This total process is one form of what is called *reading*.

The process of reading patches according to the combination of principles and components given above can be accomplished by a variety of mechanisms. The purpose of any such mechanism is to place each of the several patches into juxtaposition with a set of sensors in a prescribed order, and at the correct instant or instants to activate the reading function. Although one such mechanism is described below the basic concepts of the invention are not restricted to the use of that device, but are considered to be general.

Three important features or variables in designing such a device are selected as follows: (1) the method of positioning the patches, (2) the kind of patch pattern, and (3) the method of activating the reading function. In the first outline that follows are classes of methods of positioning patches together with comments on appropriate patch patterns. Following that outline is a short list of methods of activating the reading function.

METHODS OF POSITIONING PATCHES (I) Indirect methods of positioning patches. In these methods the objects should be uniform. Patches are prepositioned accurately and uniformly on the objects and the sensors are positioned with respect to guides or stops on the device. In operation the object is positioned with respect to the guides or stops and thus the patches are positioned with respect to the sensors.

A) Each object is brought to a stationary position with respect to guides or stops while the patches are read.

(1) Patches are read simultaneously by a number of groups of sensors. Any patch pattern can be used.

(2) One sensor is moved over the patches in a fixed path reading the patches successively. Regular patch patterns such as straight lines or circles are preferable to irregular patterns.

(3) A set of groups of sensors in a line are moved in a direction perpendicular to the line to read successive groups of patches. The suitable patch pattern is a rectangular matrix.

(B) Objects are movel along a guide so that patches are maintained at a fixed distance from the guide.

(1) Patches are read simultaneously by a number of groups of sensors. Any patch pattern can be used.

(2) One group of sensors in a fixed position reads patches successively. Patch pattern is a straight line in the direction of motion.

(3) A set of groups of sensors in a line read patches successively. Patch pattern is a set of straight lines as in FIG. 2*a* of the drawings or a rectangular matrix.

(II) Semidirect method of positioning patches. In this method patches are long bands extending the length or width of the objects. Objects must be positioned to move beneath a fixed group of sensors so that the sensors cut across the band patches as they move.

(III) Direct method of positioning patches. In these methods there is a hunting adjustment either for the code patch, for some accessory control path or for the group of sensors until the correct juxtaposition has been achieved.

(A) Objects are moved in one direction by a conveyor at a relatively slow speed while the sensors scan the width of the conveyor at a relatively rapid speed. The patch pattern can be linear in the direction of movement, or a target pattern.

(B) Objects are moved in one direction by a conveyor and the sensors are moved transversely to arrive at the proper position to read the patch pattern. The target patch pattern is most suitable. A device to execute this method is to be described.

METHOD OF ACTIVATING READING FUNCTION

There are three methods of activating the reading function: self triggering, trigering with an accessory feature, and timing.

(A) Self triggering.—If, for the moment, a patch is considered in the general sense of being any readable property on an object, then if the patch has a distinctive property not found on the object unless put there by design, then this property can be sensed and used to trigger the reading function and execute the reading function as well.

(B) Triggering accessory.—Some patch other than the reading patch which has the proper triggering characteristic mentioned in A above, or some salient property of the object can be controlled to reach its sensor when the reading patch which has the proper triggering characterand this triggering accessory is used to activate the reading function.

(C) Timing.—In this method some triggering patch or some salient part of the object, such as its leading edge, is used to trigger a timing device which in turn activates the reading function at the proper moment when the patch is juxtapositioned to the reading sensors.

Other objects and advantages will be evident to those skilled in the art after reading the following specification in connection with the annexed drawings, in which:

FIG. 1 is a diagrammatic representation of the manner in which the spectrum of electromagnetic radiations may be employed in accordance with this invention;

FIGS. 2 and 2*a* are isometric views of two objects or packages to which alternative forms of indicia means in accordance with this invention have been applied;

Figure 1:
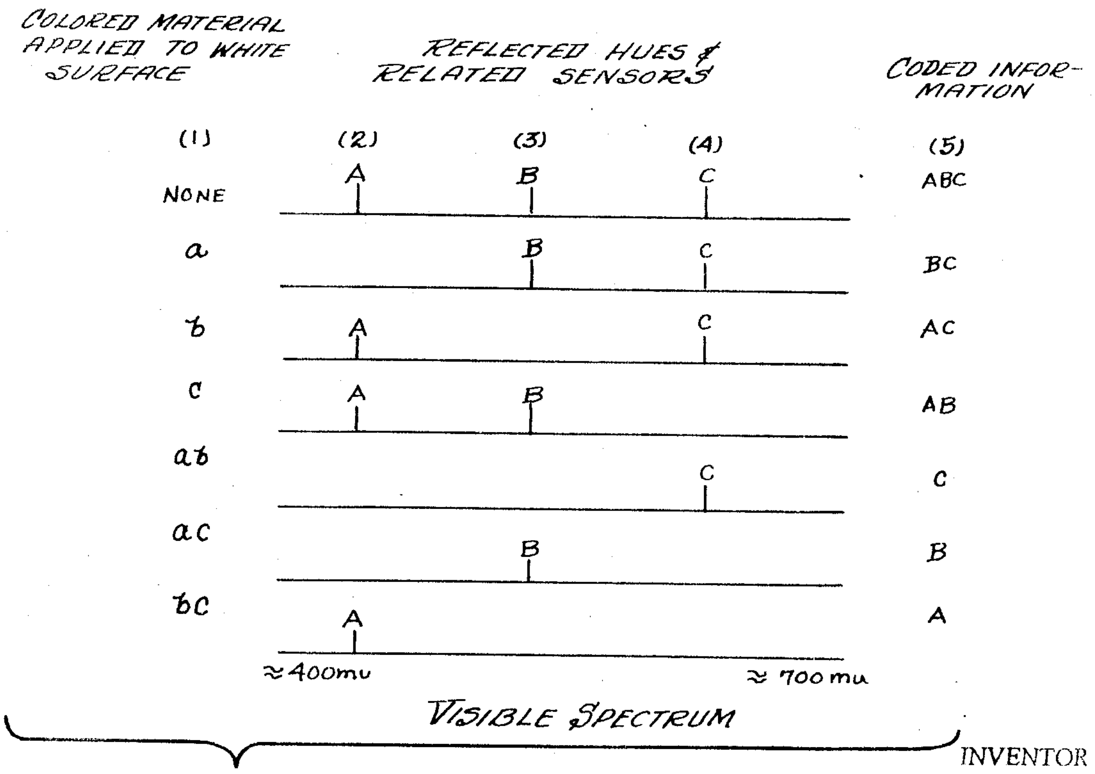

To illustrate the use by this invention of the subtractive method in controlling the reflection, three code hues are used. The horizontal lines in FIG. 1 represent the visible spectrum. Colorants *a, b* and *c* are used to absorb respectively the hues A, B and C. The positions on the lines represented by A, B and C are code hues and are relatively narrow bands of wavelengths, although represented in FIG. 1 as points. The top line indicates the code hues reflected from a white surface when no colored materials are applied to it, and the right-hand column shows that the code of the signal input to the electronic system from such a patch is ABC. The next three lines below indicate the reflected code hues when the single color absorptive materials *a, b* and *c* respectively, are applied to the three patches. The coded inputs to the system by the use of these materials are shown in the right-hand column as being BC, AC and AB respectively. The lower three lines illustrate the application of pairs of the colored materials *ab, ac* and *bc,* respectively, to produce the indicated reflected hues C, B and A respectively and the corresponding system input resulting therefrom. If all three of the materials were applied to a patch, none of the code hues would be reflected and there would be no signal input to the system. Thus three code hues provide an M of 7 as shown in Table 1.

Three materials that provide the control illustrated in FIG. 1 are available in the widely used Wratten Light Filters sold by Eastman Kodak Company. Filter No. 17 absorbs wavelengths between 405 mμ (405 millimicrons) and 440 mμ, passing most other wavelengths and thus is similar to *a* in FIG. 1. Filter No. 30 absorbs wavelengths between 505 mμ and 550 mμ, passing most other wavelengths and thus is similar to *b*. Filter No. 32A absorbs wavelengths between 562 mμ and 568 mμ, passing most other wavelengths and thus is similar to *c* in FIG. 1. The materials can be used either as film coloring or surface coloring to provide the proper patches. There are other materials that could be used to control the reflected hues and the examples given above are illustrative of the idea only.

To complete the general concept of this invention it is necessary to include a group, or possibly several groups, of N sensors. Each sensor in a group is responsive to one of the N code hues. Each group of sensors is focused so each sensor in the group can respond to only one patch and all sensors in the group can respond to the same patch. Their actual responses are controlled by the materials of the patch as shown in column 1 of FIG. 1, and the signal going into the electronic system is shown in column 5 of FIG. 1.

In the particular embodiment to be described in more detail the method of positioning described in III–B (above) is used with a target type of patch pattern and the activating of the reading function is that of B (above), a triggering accessory.

In the particular embodiment to be described two hues are used to coordinate the action of the device. These are called the *positioning hue* and the *control hue*. These two hues are emitted within a reading compartment by two kinds of patches and no other surface is permitted to emit these hues to any appreciable intensity. Also there are two kinds of sensors which, by the use of filters or diffraction gratings, respond only to these two hues.

The positioning hue and the control hue are different from all other hues in the reading compartment in that they are ultraviolet hues produced as fluorescences by two special materials when excited by another ultraviolet hue. By encasing the reading compartment in glass that absorbs the ultraviolet radiations in the general illumination, there is little or no ultraviolet radiation within the compartment except the hues put there by design. The possible existence of low level ultraviolet radiations due to stray illumination entering the reading compartment through cracks and around the conveyor can be counteracted and its activation of the positioning and control sensors is prevented by proper density filters guarding those sensors.

As will become clear at a later point it is essential that the positioning hue activate only the positioning sensors, and that no surface in the reading compartment other than the positioning patch emit the positioning hue with appreciable intensity. For that reason a material that fluoresces at as short a wavelength as feasible is selected to cover or "color" the positioning patch which thus increases the probability that no other material or surface reflects or fluoresces such a hue. Furthermore, the positioning hue is selected near the lower limit of the fluorescent band of this material.

On the other hand it is not essential that the control sensors be prevented from being activated by the positioning patches, and in practice the response of the control sensor to the positioning patch is utilized. This permits the selection of a control hue that is also within the fluorescent band of the material used for the positioning patch. However, the material selected to emit the control hue must not fluoresce a band that contains a wavelength as short as the wavelength of the positioning hue.

The fluorescence of these two materials may be excited by a single radiation or by two different radiations, but in either case such radiations must be at wavelengths well below the fluorescence of the materials in order to avoid reflections that could activate the positioning and control sensors.

An example of the kind of material that may be used for the positioning patch is triphenylmethane which when radiated by the mercury emission of 253.7 mμ will fluoresce over a band from 280 mμ to 340 mμ, and the positioning hue can be selected to be about 290 to 295 mμ. A material that can be used for the control patches is naphthalene which fluoresces over a band from 300 mμ to 360 mμ and the control hue can be selected at about 310 mμ. Clear window glass probably would permit sufficient radiation at 310 mμ to enter the reading compartment to activate the control sensor and so a tinted glass is selected for this embodiment, which absorbs radiations below about 325 mμ.

There are a number of fluorescent materials and absorbent glasses well known in the art that can be used in combination to obtain the required results.

The sources of radiation used to produce the hues within the reading compartment are two kinds of lamps. One kind, the *code lamps*, radiate visible and infrared light which is to be reflected by the code patches as code hues. These lamps may be either broad spectrum lamps or special narrow band lamps which radiate high intensities at the code hue wavelengths. In the embodiment to be described broad spectrum lamps are used.

The other kind of lamp, the *control lamps*, radiate ultraviolet light, either specific wavelengths or reasonably broad bands. The lamps selected for the embodiment described is a mercury lamp emitting a wavelength of 253.7 mμ. These lamps radiate continuously when the device is in operation.

Figures 2, 2A:
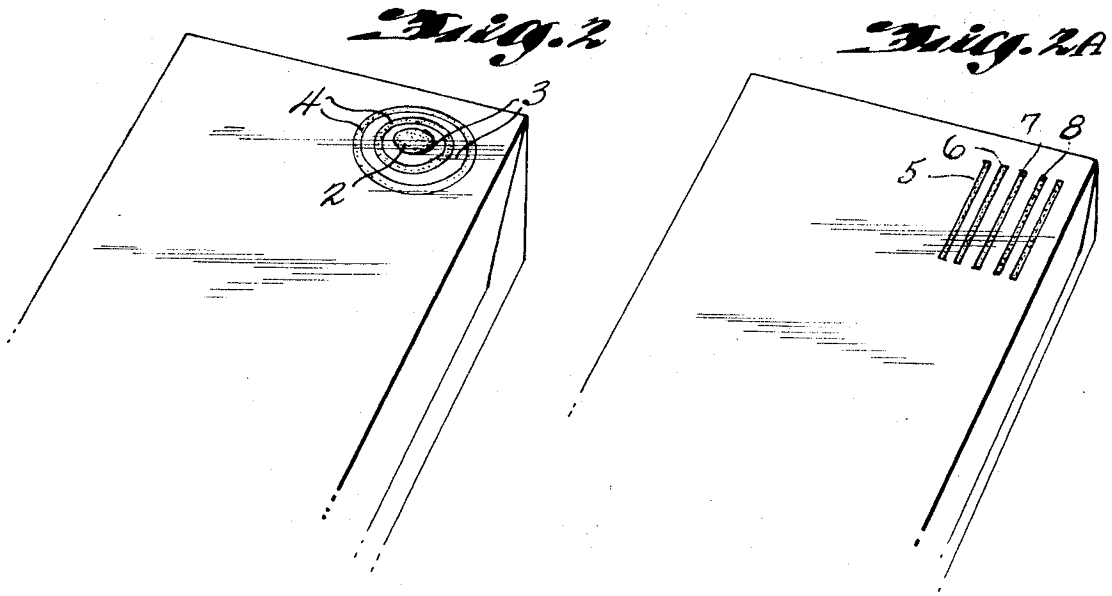

Referring in FIG. 2 the patch pattern shown there is one example of the pattern used in this particular embodiment. This patch pattern is defined as follows: a set of closed and non-intersecting bands 3 and 4 surrounding a central spot 2, which bands and spots may be irregular plane figures, or may be regular plane figures, or may approximate regular plane figures such as circles, ellipses, or polygons, such that all lines lying on the surface of the patch pattern which have no curvature of radius less than 2 inches and which pass through the central spot will intersect all the bands in the same order. In this definition the word "band" is used to mean a stripe. In the invention the bands serve as patches that reflect hues. From the above definition any line reaching the central spot will have passed over all the bands of the patch pattern in a uniform and prescribed order. Such a line also passes over all the bands in the inverse order in going outward from the central spot. In the invention the code sensors follow such a line, and thus always scan the code patches, to be defined, in a specified order.

The number of bands constituting the patch pattern will depend upon the number of patches required, from Table 2. If there are P patches required from Table 2, the number of bands will be 2P. Counting out from the central spot there will be P odd numbered bands 3 which when properly radiated will emit the selected code hues and which are referred to from hereon as *code patches*. In like manner there are P even bands 4 which when properly radiated by the ultraviolet lamps emit only the control hue; these bands are the *control patches*. The central spot emits only the positioning hue.

The patch pattern need not be level, planar nor smooth when carried by an object. It may curve and slope to conform to the object which carries it so long as every point on its surface is exposed vertically upward, so as to be viewable from the code sensors when they are overhead.

Figure 3:
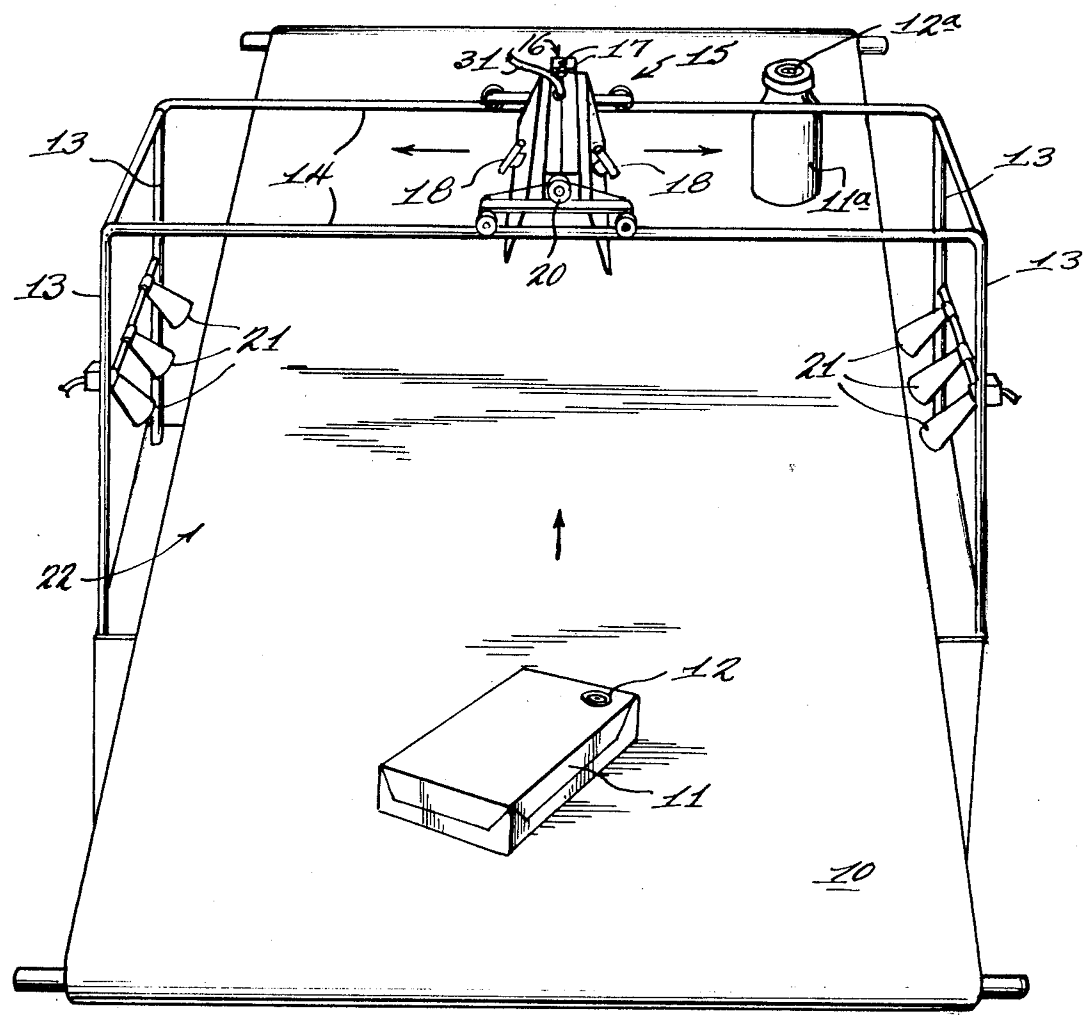
FIG. 3 is an isometric view of one form of sensing mechanism, including conveyor means for the packages of either FIGS. 2 or 2*a* for use in scanning the indicia means.

Referring to FIG. 3, the device is seen from the end away from which the conveyor 10 is moving, that is, the upstream end. On the conveyor are objects 11 and **11*a* carrying a patch pattern 12 and 12*a* respectively. Over the conveyor, supported by vertical members 13 is a transverse track 14. On this track runs a carriage 15**, the long dimension of which is in the direction of the conveyor movement.

The carriage carries on its midline 16 at its downstream end, a group of sensors 17 which consists of N code sensors and two control sensors. The carriage also carries toward its upstream end two positioning sensors 18 each of which is sensitive to radiation of wavelengths of about 295 mμ from a large area on its own side of the carriage and a shield for each positioning sensor 19. The shields and the positioning sensors are located relative to each other so that each positioning sensor may sense the position hue from the central spot of the patch pattern only when that spot is on the same side of the midline of the carriage as the respective sensor and also such that the central spot will be obscured from both sensors when that spot is directly under the midline of the carriage.

The positioning sensors are connected through a comparison circuit, such as a Wheatstone bridge, in such a manner that a small motor 20 which drives the carriage drives it toward the patch pattern. This movement brings the midline of the carriage toward and over the central spot of the patch pattern. In this position, since neither positioning sensor is in line to sense the positioning hue, the carriage remains stationary. Also since the midline of the carriage is aligned with the movement of the conveyor, the central spot follows beneath the midline until the patch pattern reaches the group of sensors at the downstream end.

Sets of lamps 21 are located in fixtures supported by the vertical members on each side of the conveyor. Both kinds of lamps mentioned earlier are in the set of lamps. These lamps are oriented and shaded so as to send no radiation towards the sensors and to send most of their radiation onto the conveyor. They are raised above the conveyor to a distance to minimize the probable specular glare reflected from the conveyor, the objects it carries and the patch pattern on the objects in the direction of the sensors.

Referring to FIG. 3 the embodiment is seen from above. The conveyor 10 is moving in a direction that appears upward on the page. The vertical supports 13, cross tracks 14 and carriage 15 are as described above. Conductors 31 carry the output of the group of code sensors 17 to the electronic system as potential input to that system. Positioning sensors 18 and their respective shields 19 are symmetrically located on each side of the midline 16. Electrical conductors 32 carry the output from the positioning sensors to the carriage motor 20 and power lines 33 feed into the motor from an outside power source.

An object 11*a* has just passed the sensing mechanism and an object 11 is on the conveyor and is approaching the sensing mechanism. As the conveyor brings the object and its patch pattern 12 into the reading compartment 22 and under the positioning sensors these sensors will respond to signal the motor 20 to move the carriage to bring the midline and the code sensors in line with the central spot of the patch pattern. Upon reaching the correct position over the central spot the carriage will stop. If it should overshoot the correct position the opposite positioning sensor would reverse the direction. A dampening effect upon the movement for efficient positioning is produced by decreasing the sensitivity of the positioning sensors when the central spot is near the correct position, and thus reduce the speed of the carriage as the midline approaches the central spot of the patch pattern. This is done by properly placing density filters on the shields and by angling the positioning sensors outwardly as to be somewhat less sensitive to radiations near the midline.

The code sensors and the control sensors at the downstream end of the carriage 17 have sharply focused sensitivity so as to respond only to a very small area, the size of the area being dependent upon the dimensions of the patches on the path pattern.

Figure 5:
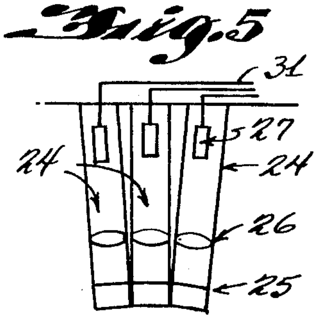
FIG. 5 is a schematic diagram of the sensors on an enlarged scale.
Figure 4:
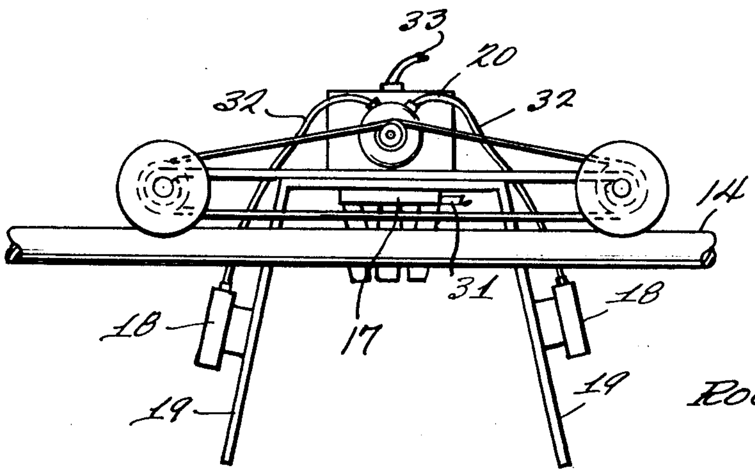
FIG. 4 is a front elevation of a portion of the mechanism shown in FIG. 3.

Referring to FIG. 5, three code sensors of the group of five sensors 17, shown in FIG. 3, are seen in some detail. The two control sensors, to be described, can be thought of as being in front of and behind the central sensor of the three in FIG. 5. In practice there is a group of $N+2$ tubes 24, each with a lens 26, a specific filter to pass a specific hue 25, a photoelectric cell 27, and a conductor to the elecertonic system 31. N of these tubes are the code sensors (three in FIG. 5), one tube for each of the N code hues. The other two are the control sensors, which are designated control sensor A and control sensor B. The design of these sensors is well established in the art of photometry and need not be given in more detail.

Control sensor A responds to either the position hue or to the control hue and thus is activated by the control patches and the central spot. Control sensor B responds only to the positioning hue and is activated only by the central spot. The code sensors all focus on the same small area so as to be responsive to the same patch for a single reading. Control sensor A is forcused slightly downstream from the code sensors, so as to sense, except for the first patch encountered, a control patch or the central spot when the code sensors are still focused on the code patch just behind. Control sensor B is focused slightly upstream from the code sensors. It thus responds to the central spot after all the code patches have been read one. Its function is to terminate the initial series of readings during the inward movement of the sensors across the patch pattern. It also has the function of preparing the system for an inverse check reading of the code patches as they are once more traversed, this time in an outwardly direction.

The behavior of this embodiment can be described as follows. An object is placed on the conveyor 10, which is continuously moving, with the patch pattern in an upward direction as viewed in FIG. 3. As the object and its patch pattern passes into the reading compartment the central spot of the patch pattern will be excited by the ultraviolet lamps in the compartment and will fluoresce and emit the positioning hue, as well as the control hue. Neither of the control sensors in the group of sensors respond at this point because they are narrowly focused on a small area considerably downstream. Only the positioning sensor nearer to the patch pattern will respond to the central spot because the farther positioning sensor is on the opposite side of the midline of the carriage and is shielded so as to respond to radiation from only its own side. Although the control bands of the patch pattern outside the central spot are also fluorescing the control hue, the positioning sensors are not sensitive to the control hue.

The response of the nearer positioning sensor to the positioning hue emitted by the central spot sets up a current in the carriage motor such that the carriage will move toward the patch pattern. As the central spot nears the midline of the carriage, the carriage begins to slow down and comes to rest when the central spot is directly beneath the midline.

After the central spot of the patch pattern has reached the midline it remains there and the conveyor moves the object so that the central spot follows below the midline toward the group of sensors. Such a movement will cause the small area on which the group of code sensors are focused to scan a line across the patch pattern and through its central spot that was specified in the definition of the patch pattern given previously. The two control sensors also scan such a line.

As a result of the combined movements of the carriage under the control of the positioning sensors and of the conveyor, all the code and control sensors will scan the patch pattern in a line specified in its definition regardless of where the object is placed on the conveyor, regardless of the size and shape of the object, within limits, and regardless of the orientation of the object provided only that the entire patch pattern can be viewed from directly overhead. The patch pattern is so defined that a rotating table could serve as a conveyor.

Control sensor A will first scan the outermost control patch and will respond to it by sending a signal to prepare the electronic system to accept a code signal. Next control sensor A will scan the outermost code patch without responding to it; meanwhile the code sensors will begin to scan the outermost code patch but will not respond until the control sensor A scans the next control patch, which it does shortly before the code sensors leave the code patch. The response of control sensor A to this control patch initiates the read function. The read function is the picking up of the responses of the code sensors to the code patch and entering them in symbolic form in a buffer storage, for temporary holding. This read function takes a fraction of a second and is self-terminating. The buffer storage is in the electronic system and since its design is well established in the art of computer manufacture it is not described here.

For the reading function to be reinstated the control sensor A must cease to scan the control patch, pass over the next code patch to which it does not respond, and then scan the next control patch. At this point the read function is again activated and the code sensors being on the second code patch respond to it. This cycle continues with the code sensors reading each code patch on their path toward the central spot. Since the central spot emits the control hue as well as the positioning hue control sensor A responds to it and activates the read function as the sensors are over the first band outside the central spot.

The central spot of the patch pattern is large enough so that control sensor B reaches it before control sensor A reaches the first control patch in its outward path. Control sensor B is sensitive to only the positioning hue and has made no response to the patch pattern prior to scanning the central spot. Because control sensor B is focused slightly upstream from the code sensors all the patches will have been read in an inward direction by the time it responds. The response of control sensor B is to terminate the series of first readings and to initiate an inverse series of check readings as the patches are traversed outwardly. The sensors act in this outward movement similarly as they did on their inward movement across the patch pattern. The reading function differs in that the coded information received at each reading is compared to the corresponding information from the previous reading which is stored in the buffer. If there is a mismatch a shunting gate is dropped to sidetrack the object on the conveyor for individual attention, and the information from the patch is not entered from the buffer into the permanent store of the electronic system. If all check readings match the first readings then the complete message in the buffer is entered into the electronic system as a message, and the reading series is terminated until control sensor A is again activated. These electronic operations are achievable by methods well known in the art of computer manufacture and are not here further described.

FIGURE 2*a* shows a patch which may be used with the semidirect method of poistioning patches described in paragraph II under the main heading, Methods of Positioning Patches. In this case the code hues may comprise a series of parallel narrow areas of varying code hues 5, 6, 7 and 8, each of which may comprise a colorant having one or more code hues contained therein.

With this method the patch must first be positioned for relative linear movement with respect to a series of code sensors such that the successive areas (or lines) 5, 6, 7 and 8, will be scanned in succession by the sensors. In general, this means that the patch will be positioned on an article at a predetermined distance from one margin, so that when the article is placed with that margin against a guide and moved while contact is maintained, the patch will be correctly positioned for scanning by the code sensors. Alternatively, the sensors may be moved while the article is in fixed position with respect to the guide.

Having disclosed several forms in which the invention may be practiced, it will be obvious to those skilled in the art that various modifications and improvements may be made which would come within the scope of the annexed claims.

I claim:

1. In a system for identifying articles of assorted shapes, sizes and surface textures, the combination including a particular indicia means associated with each article, scannning means including a plurality of sensing means, conveying means for moving said articles in a path across a sensing line while randomly angularly oriented with respect thereto, and positioning means for moving the sensing means along the sensing line for alignment with indicia means associated with each article moving in said path without affecting said random orientation, each said indicia means comprising a surface having a plurality of colorants arranged in a predetermined sequence of successively enclosing zones, each said colorant being responsive to a particular source of a spectrum of radiant energy to reflect a particular band of radiant energy, said plurality of sensing means being responsive to scanning of the plurality of colorants of an indicia means in a predetermined sequence to provide a signal identifying the article associated with that indicia means, one of said sensing means being responsive to a predetermined colorant of said indicia means for actuating the positioning means for alignment of the sensing means with the indicia means, whereby the signal provided by the sensing means in response to scanning a particular sequence of indicia means during movement of the associated article by said conveying means in said path will be the same regardless of the angular orientation of the indicia means with respect to said path of movement.

2. The invention defined in claim 1 wherein said zones are substantially symmetrical about a central zone.

3. The invention defined in claim 2 wherein said positioning means is responsive to a signal derived by the sensing of energy reflected by said central zone colorant.

4. The invention defined in claim 3 wherein said central zone colorant is fluorescent.

5. The invention defined in claim 1, wherein at least one of said colorants may reflect a plurality of bands of radiant energy.

6. The invention defined in claim 5 wherein said positioning means may be responsive to a signal derived from one of the bands of energy reflected by said one colorant.

7. Method of identifying articles comprising the steps of selecting a plurality of colorants each for reflecting a predetermined band of radiant energy from a source of a spectrum of radiant energy, attaching said colorants to an article in a pattern having certain colorants arranged in zones enclosing one of said colorants in a predetermined sequence of zones, moving said article in a path across a sensing line to permit said one colorant to be sensed by a sensing means to provide a signal for aligning said sensing means and indicia with each other for deriving another signal from the sequence in which said plurality of colorants are sensed as a result of further movement in said path without regard to the angular orientation of the indicia.

References Cited

UNITED STATES PATENTS

| | | | |
|---|---|---|---|
| 2,888,570 | 5/1959 | Toulmin | 250—226 X |
| 2,899,132 | 8/1959 | Orthuber | 250—226 X |
| 3,003,388 | 10/1961 | Hunter et al. | 250—226 X |
| 3,004,702 | 10/1961 | Kranz | 250—223 X |
| 3,074,634 | 1/1963 | Gamo. | |
| 3,105,908 | 10/1963 | Burkhardt et al. | 250—226 X |
| 3,138,783 | 6/1964 | Toulmin | 250—226 X |
| 3,196,393 | 7/1965 | Siegemund. | |
| 3,207,910 | 9/1965 | Hirschfeld et al. | 250—226 |
| 3,229,102 | 1/1966 | Spencer et al. | 250—203 |
| 3,350,545 | 10/1967 | Street. | |

ARCHIE R. BORCHELT, Primary Examiner

M. ABRAMSON, Assistant Examiner

U.S. Cl. X.R.

209—111.6; 250—223, 226